United States Patent
Xu et al.

(10) Patent No.: US 7,596,288 B2
(45) Date of Patent: Sep. 29, 2009

(54) MICRO DISPLACEMENT SENSOR

(75) Inventors: Zhen-Feng Xu, Beijing (CN); Guo-Fan Jin, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/964,539

(22) Filed: Dec. 26, 2007

(65) Prior Publication Data

US 2008/0159685 A1   Jul. 3, 2008

(30) Foreign Application Priority Data

Dec. 27, 2006  (CN) .......................... 2006 1 0157991

(51) Int. Cl.
*G02F 1/295* (2006.01)
(52) U.S. Cl. .......................................... 385/4; 385/129
(58) Field of Classification Search ................... 385/12, 385/129
See application file for complete search history.

(56) References Cited

U.S. PATENT DOCUMENTS

| | | | |
|---|---|---|---|
| 5,353,115 A | 10/1994 | McIntyre | |
| 6,064,506 A * | 5/2000 | Koops | 359/237 |
| 6,407,815 B2 | 6/2002 | Akihiro | |
| 6,571,028 B1 * | 5/2003 | LoCascio et al. | 385/16 |
| 6,724,486 B1 | 4/2004 | Shull et al. | |
| 6,747,773 B2 * | 6/2004 | Theil et al. | 359/237 |
| 6,778,722 B1 * | 8/2004 | Klocek et al. | 385/16 |
| 6,870,970 B2 * | 3/2005 | Leonard et al. | 385/5 |
| 6,891,993 B2 * | 5/2005 | Prather et al. | 385/24 |
| 6,922,509 B2 * | 7/2005 | Hamada | 385/48 |
| 6,961,501 B2 * | 11/2005 | Matsuura et al. | 385/129 |
| 7,120,344 B2 * | 10/2006 | Noda et al. | 385/129 |
| 7,155,087 B2 * | 12/2006 | Suh et al. | 385/27 |
| 7,215,842 B2 * | 5/2007 | Sakai et al. | 385/16 |
| 7,310,182 B2 * | 12/2007 | Salib | 359/321 |
| 7,412,127 B2 * | 8/2008 | Suh et al. | 385/27 |
| 7,466,424 B2 * | 12/2008 | Nathan et al. | 356/482 |
| 2002/0021878 A1 * | 2/2002 | Allan et al. | 385/129 |
| 2002/0048422 A1 * | 4/2002 | Cotteverde et al. | 385/4 |
| 2002/0076128 A1 * | 6/2002 | LoCascio et al. | 385/5 |
| 2002/0191933 A1 * | 12/2002 | Tokushima | 385/129 |
| 2003/0026570 A1 * | 2/2003 | Malsuura et al. | 385/129 |

(Continued)

FOREIGN PATENT DOCUMENTS

CN   1851392   10/2006

*Primary Examiner*—Frank G Font
*Assistant Examiner*—Peter Radkowski
(74) *Attorney, Agent, or Firm*—D. Austin Bonderer

(57) ABSTRACT

A micro displacement sensor includes a first photonic crystal module, a second photonic crystal module, a light source and a detector. The first photonic crystal module includes a first substrate and a plurality of first photonic crystals, disposed on the first substrate and are arranged in a matrix. The first photonic crystals define a first light-guide channel having a light input end and a light output end. The second photonic crystal module includes a second substrate, disposed parallel to the first substrate, and a plurality of second photonic crystals, disposed on the second substrate and are arranged in a matrix. The second photonic crystals define a second light-guide channel having a light coupling end and a light detected end. The light source is disposed adjacent to the light input end. The detector is disposed adjacent to the light detected end.

18 Claims, 4 Drawing Sheets

U.S. PATENT DOCUMENTS

| | | | |
|---|---|---|---|
| 2003/0099428 A1* | 5/2003 | LoCascio et al. | 385/16 |
| 2003/0133661 A1* | 7/2003 | Adibi et al. | 385/43 |
| 2003/0202728 A1* | 10/2003 | Leonard et al. | 385/5 |
| 2004/0008945 A1* | 1/2004 | Sigalas | 385/45 |
| 2004/0080726 A1* | 4/2004 | Suh et al. | 353/122 |
| 2004/0165850 A1* | 8/2004 | Noda et al. | 385/129 |
| 2004/0208426 A1* | 10/2004 | Lee et al. | 385/21 |
| 2004/0213534 A9* | 10/2004 | Matsuura et al. | 385/129 |
| 2005/0002605 A1* | 1/2005 | Sakai et al. | 385/27 |
| 2005/0185966 A1* | 8/2005 | Salib | 398/164 |
| 2005/0200942 A1* | 9/2005 | Grot et al. | 359/321 |
| 2006/0070823 A1 | 4/2006 | Huang et al. | |
| 2006/0088240 A1* | 4/2006 | Aoki et al. | 385/9 |
| 2006/0103851 A1* | 5/2006 | Nathan et al. | 356/482 |
| 2006/0198567 A1* | 9/2006 | Levy et al. | 385/12 |
| 2006/0280403 A1* | 12/2006 | Suh et al. | 385/27 |
| 2007/0025657 A1* | 2/2007 | Oya et al. | 385/4 |
| 2007/0081165 A1* | 4/2007 | Kilic et al. | 356/477 |
| 2008/0034866 A1* | 2/2008 | Kilic et al. | 73/514.26 |

* cited by examiner

MICRO DISPLACEMENT SENSOR

BACKGROUND OF THE INVENTION

1. Field of the Invention

The invention relates to displacement sensors and, particularly, to a micro displacement sensor based on photonic crystals.

2. Description of Related Art

A micro displacement sensor is important for a microelectron-mechanical system (MEMS). The micro displacement sensors are configured to precisely measure a relative displacement between elements in MEMS. Additionally, the micro displacement sensors are widely used in varied devices, such as biosensor or atomic force microscopy (AFM).

Because photonic crystals have photonic band gaps (PBGs), micro displacement sensors based on the photonic crystals are extensively being developed. Micro displacement sensor based on photonic crystals can have a high sensitivity ranging from about 1 a to about 1.6 a ("a" being a lattice constant), even though a measuring range for such a sensor is within the range of less than 1.5 a. In addition, a micro displacement sensor based on a photon tunneling effect and a Fano interference effect can obtain a 20 dB transmission contrast when a relative displacement changes by about 1% of operating wavelength. Moreover, a micro displacement sensor based on a defect resonant cavity in a photonic crystal can provide a sensitivity ranging from about 1 a to about 1.15 a, even though a measuring range for such a sensor is within the range of from −0.55 a to 0.60 a.

However, the measuring range for displacement provided by the micro displacement sensors mentioned above is limited. That is, it is difficult to obtain a micro displacement sensor with a wide dynamic range for displacement measurement. Particularly, it is difficult to measure a relative displacement ranging over twofold order of the lattice constant by such micro displacement sensors.

What is needed, therefore, is a micro displacement sensor having a large dynamic range of displacement measurement.

SUMMARY OF THE INVENTION

A micro displacement sensor is provided. In one embodiment, the micro displacement sensor includes a first photonic crystal module, a second photonic crystal module, a light source and a detector. The first photonic crystal module includes a first substrate and a plurality of first photonic crystals. The first photonic crystals are disposed on the first substrate and are arranged in a matrix. The first photonic crystals define a first light-guide channel having a light input end and a light output end. The second photonic crystal module includes a second substrate and a plurality of second photonic crystals. The second substrate is disposed parallel to the first substrate. The second photonic crystals are disposed on the second substrate and are arranged in a matrix. The second photonic crystals define a second light-guide channel having a light coupling end and a light detected end. The light source is disposed adjacent to the light input end of the first photonic crystal module. The detector is disposed adjacent to the light detected end of the second photonic crystal module.

Another micro displacement sensor is provided. In one embodiment, the micro displacement sensor includes a first photonic crystal module, a second photonic crystal module, a third photonic crystal module, a light source, a first detector and a second detector. The first photonic crystal module includes a first substrate and a plurality of first photonic crystals. The first photonic crystals are disposed on the first substrate and are arranged in a matrix. The first photonic crystals define a first light-guide channel having a light input end and two light output ends. The second photonic crystal module includes a second substrate and a plurality of second photonic crystals. The second substrate is disposed parallel to the first substrate. The second photonic crystals are disposed on the second substrate and are arranged in a matrix. The second photonic crystals define a second light-guide channel having a first light coupling end and a first light detected end. The third photonic crystal module interconnects with the first photonic crystal module and the second photonic crystal module. The third photonic crystal module includes a third substrate and a plurality of third photonic crystals. The third photonic crystals are disposed on the third substrate and arranged in a matrix. The third photonic crystals defining a third light-guide channel having a second light coupling end and a second light detected end. The light source is disposed adjacent to the light input end of the first photonic crystal module. The first detector is disposed adjacent to the first light detected end of the second photonic crystal module. The second detector is disposed adjacent to the second light detected end of the third photonic crystal module Other advantages and novel features of the present micro displacement sensor will become more apparent from the following detailed description of preferred embodiments, when taken in conjunction with the accompanying drawings.

BRIEF DESCRIPTION OF THE DRAWINGS

Many aspects of the present micro displacement sensor can be better understood with reference to the following drawings. The components in the drawings are not necessarily to scale, the emphasis instead being placed upon clearly illustrating the principles of the present micro displacement sensor.

Figure 1:
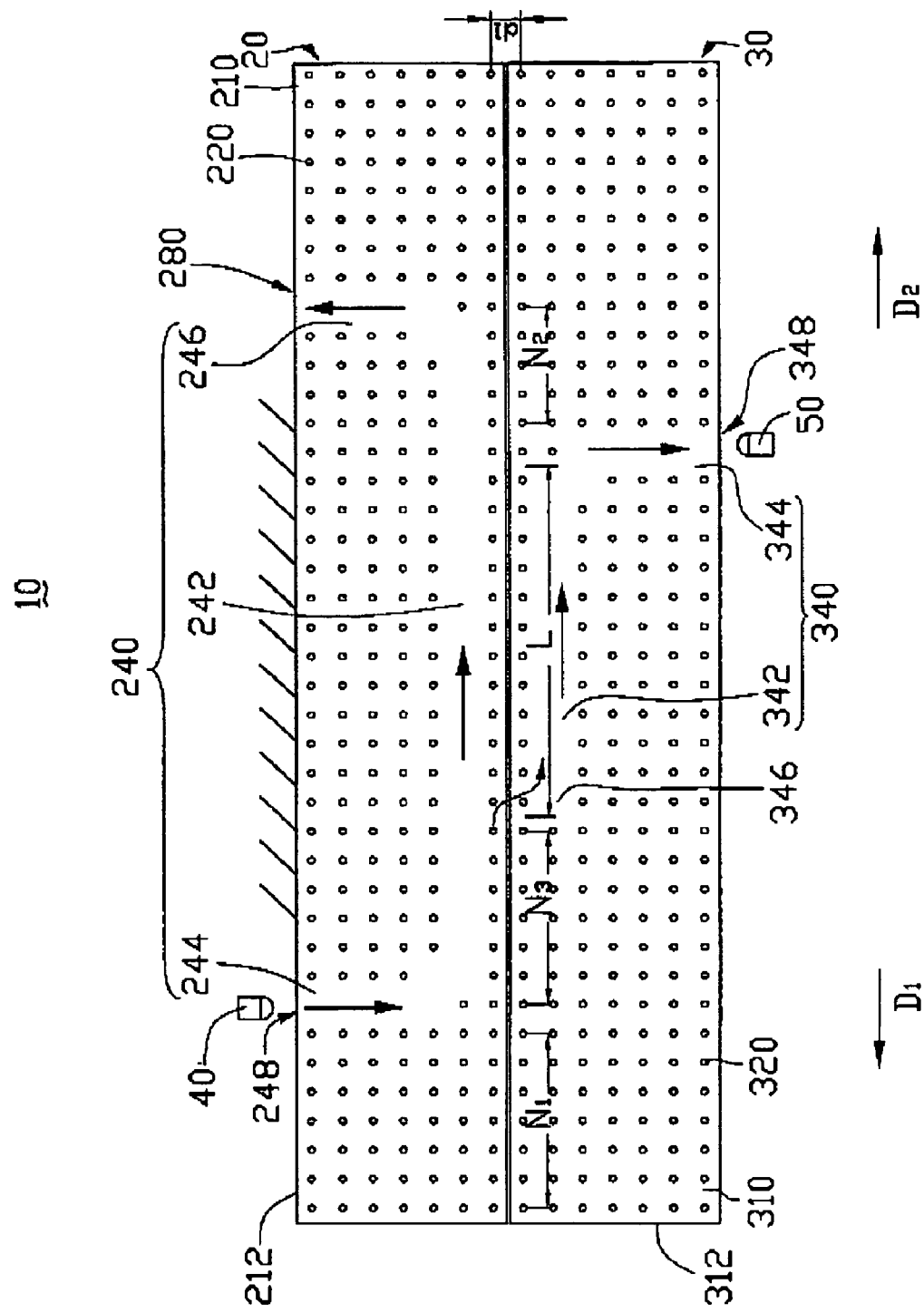
FIG. 1 is a schematic view of a micro displacement sensor, in accordance with a first embodiment.

Corresponding reference characters indicate corresponding parts throughout the several views. The exemplifications set out herein illustrate at least one preferred embodiment of the present micro displacement sensor, in one form, and such exemplifications are not to be construed as limiting the scope of the invention in any manner.

DETAILED DESCRIPTION OF THE INVENTION

Reference will now be made to the drawings to describe embodiments of the present micro displacement sensor, in detail.

Referring to FIG. 1, a micro displacement sensor 10, according to a first embodiment, is shown. The micro displacement sensor 10 includes a first photonic crystal module 20, a second photonic crystal module 30, a light source 40 and a detector 50.

One side of the first photonic crystal module 20 is fastened to a fixed part. The first photonic crystal module 20 includes a first substrate 210 and a plurality of first photonic crystals 220. The first photonic crystals 220 are disposed perpendicularly on the first substrate 210. The first photonic crystals 220 are arranged in a matrix on the first substrate 210. Some of the first photonic crystals 220 in the matrix are missing. Defected photonic crystals are arranged in the matrix of the first photonic crystals 220 in order to form a first light guide channel 240. The first light-guide channel 240 is formed in a "⊔" shape, as shown in FIG. 1. The first light-guide channel 240 includes a first part 242 and two second parts 244, 246. The second parts 244, 246 are disposed perpendicularly to and communicate with the first part 242. That is, the second parts 244, 246 are connected with two ends of the first part 242. The first light-guide channel 240 has a light input end 248 and a light output end 280.

The second photonic crystal module 30 includes a second substrate 310 and a plurality of second photonic crystals 320. The second substrate 310 is disposed parallel to the first substrate 210. In addition, the first substrate 210 and the second substrate 310 are coplanar. The first substrate 210 and the second substrate 310 can be movable relative to each other. The second photonic crystals 320 are disposed perpendicularly on the second substrate 310 and are arranged in a matrix. Moreover, the second photonic crystals 320 are arranged according to the first photonic crystals 220. Particularly, an array of the second photonic crystals 320 is aligned with an array of the first photonic crystals 220.

Some of the second photonic crystals 320 in the matrix are missing. Defected photonic crystals are arranged in the matrix of the second photonic crystals 320 in order to form a second light guide channel 340. The second light-guide channel 340 has a light coupling end 346 and a first light detected end 348. In the present embodiment, the second light-guide channel 340 is formed in "⊤" shape, as shown in FIG. 1. Particularly, the second light-guide channel 340 includes a third part 342 and a fourth part 344 that are perpendicular with each other. In addition, the third part 342 of the second light-guide channel 340 is parallel to the first part 242 of the first light-guide channel 240. Particularly, the third part 342 is spaced apart from the first part 242 by a row of the array of first photonic crystals 220 and by a row of the array of second photonic crystals 320. In such case, when the photonic crystals are adjacent to each other, the distance from the center of the last row of photonic crystals, in the substrate 210, to the center of the first row of photonic crystals, in substrate 310, is $d_1$. The distance $d_1$ can be approximately from 0.7 a to 1.1 a. In addition, the third part 342 has a length L in an approximately range from 10 a to 30 a.

The light source 40 is disposed adjacent to the light input end 248 of the first photonic crystal module 20. The detector 40 is disposed adjacent to the light detected end 348 of the second photonic crystal module 30. In such case, the light source 40 is a laser source. The detector 50 is an optical fiber detector.

In the present embodiment, the first substrate 210 or the second substrate 310 is made of an insulating material or a semi-conduction material, for example, silicon or silicon oxide. The lattice constant of the first photonic crystal 220 is about equal to that of the second photonic crystal 320. Preferably, the lattice constant is in an approximately range from 100 nm to 100 μm. Each of the first photonic crystals 220 or the second photonic crystals 320 has a crystallite diameter of an approximately range from 0.3 a to 0.7 a.

Referring to FIG. 1, $N_1$ is the distance from the column of photonic crystals that borders the left side of the second part 244 of the first light guide channel 240 to the first column of second photonic crystals 320 in the second photonic crystal module 30. $N_2$ is the distance from the column of the second photonic crystals 320 that borders the right side of the fourth part 344 to the second part 246 having the light output end 280. $N_3$ is the distance from the light coupling end 346 to the second part 244 of the first light-guide channel 240. When the second photonic crystal module 30 moves relative to the first photonic crystal module 20 (e.g. move left or right relative to the first photonic crystal module 20), values of $N_1$, $N_2$ and $N_3$ should always be positive in order to make sure that light traveling in the first part 242 of the first light-guide channel 240 will be coupled into the third part 342 of the second light-guide channel 340.

In particular, when the second photonic crystal module 30 moves horizontally to the left, that is, in the direction of $D_1$, the light coupling end 346 of the second light-guide channel 340 should not be to the left-side of the second part 244 having the light input end 248. When the second photonic crystal module 30 moves horizontally to the right, that is, in the direction of $D_2$, the fourth part 344 of the second light-guide channel 340 should not be to the right-side of the second part 246 having the light output end 280. In the case when the second photonic crystal module 30 moves to the right, the first or left most column of the second photonic crystals 320 should not go beyond the second part 244 having the light input end 248.

Figure 2:
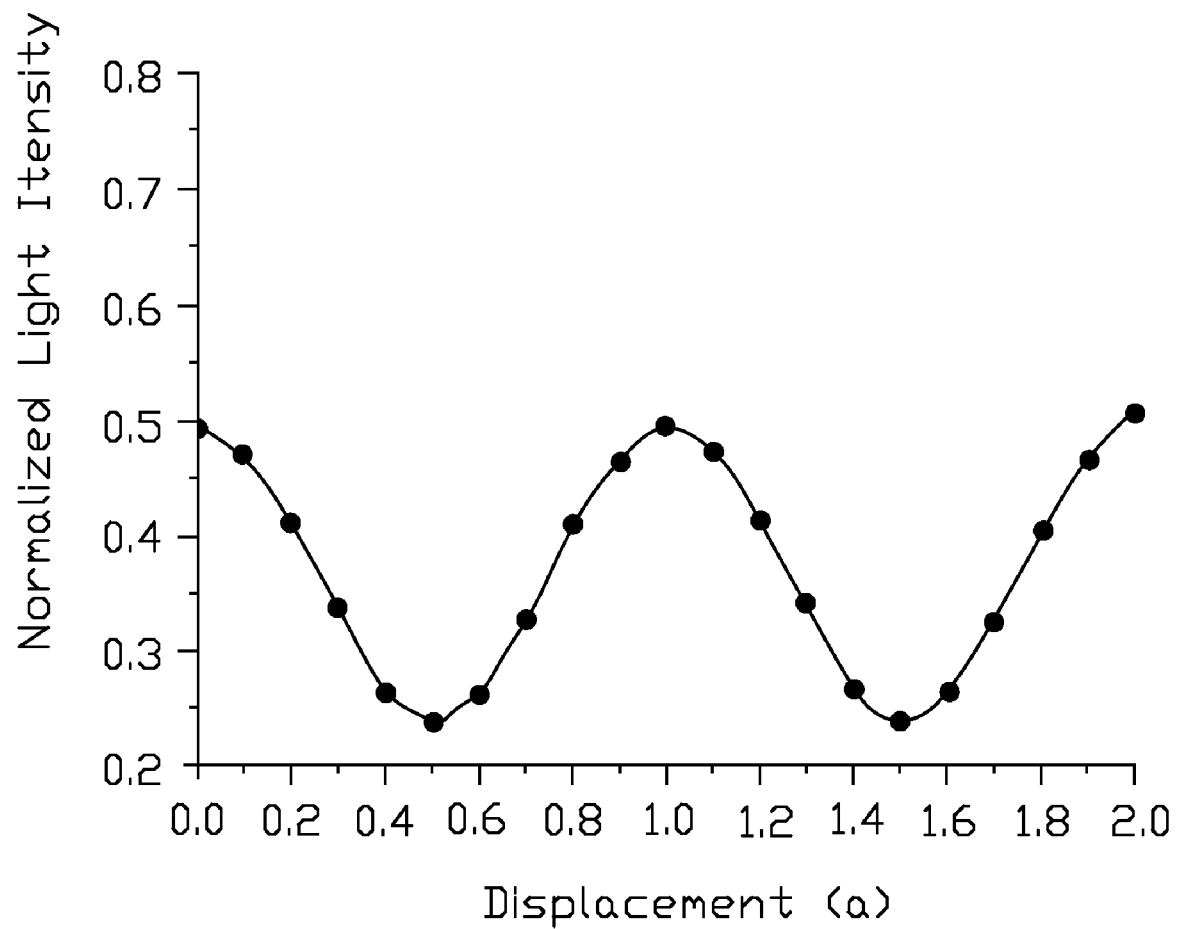
FIG. 2 is a graph of light intensity with respective to displacements measured by the micro displacement sensor of FIG. 1.

In practice, the second photonic crystal module 30 is attached to a moving test object and the first photonic crystal module 20 is stationary. When the second photonic crystal module 30 moves relative to the first photonic crystal module 20, light emitted from the light source 40 enters into the first light-guide channel 240 of the first photonic crystal module 20. Most of the light from the light source 40 is guided in the first light-guide channel 240 and is emitted from the light output end 280 of the first light-guide channel 240. Some of the light, from the light source 40, is coupled into the second light-guide channel 340 through the light-coupling end 346 based on a coupling effect. As a result, the portion of the light, coupled into the second light-guide channel 340, with be guided to and detected by the detector 50. As the second photonic crystal module 30 moves relative to the first photonic crystal module 20, changes in coupling efficiency will cause the coupled light intensity to change accordingly. Referring to FIG. 2, a sinusoidal graph showing a correlation between the displacement of the moving test object and the light intensity detected by the detector 50 is obtained. Therefore, the displacements of the second photonic crystal module 30 can be estimated according to such a sinusoidal graph. In addition, calculating the displacement using a subdivision method, the micro displacement sensor 10 can achieve a resolution of less than 0.01 a, where a is a lattice constant.

In the present embodiment, a measuring range of the micro displacement sensor is an integer numbered multiple of the lattice constant. Additionally, by way of controlling the values of $N_1$, $N_2$, and $N_3$, the micro displacement sensor 10 in the present embodiment can have a measurement range over a tenfold order of lattice constant.

Figure 3:
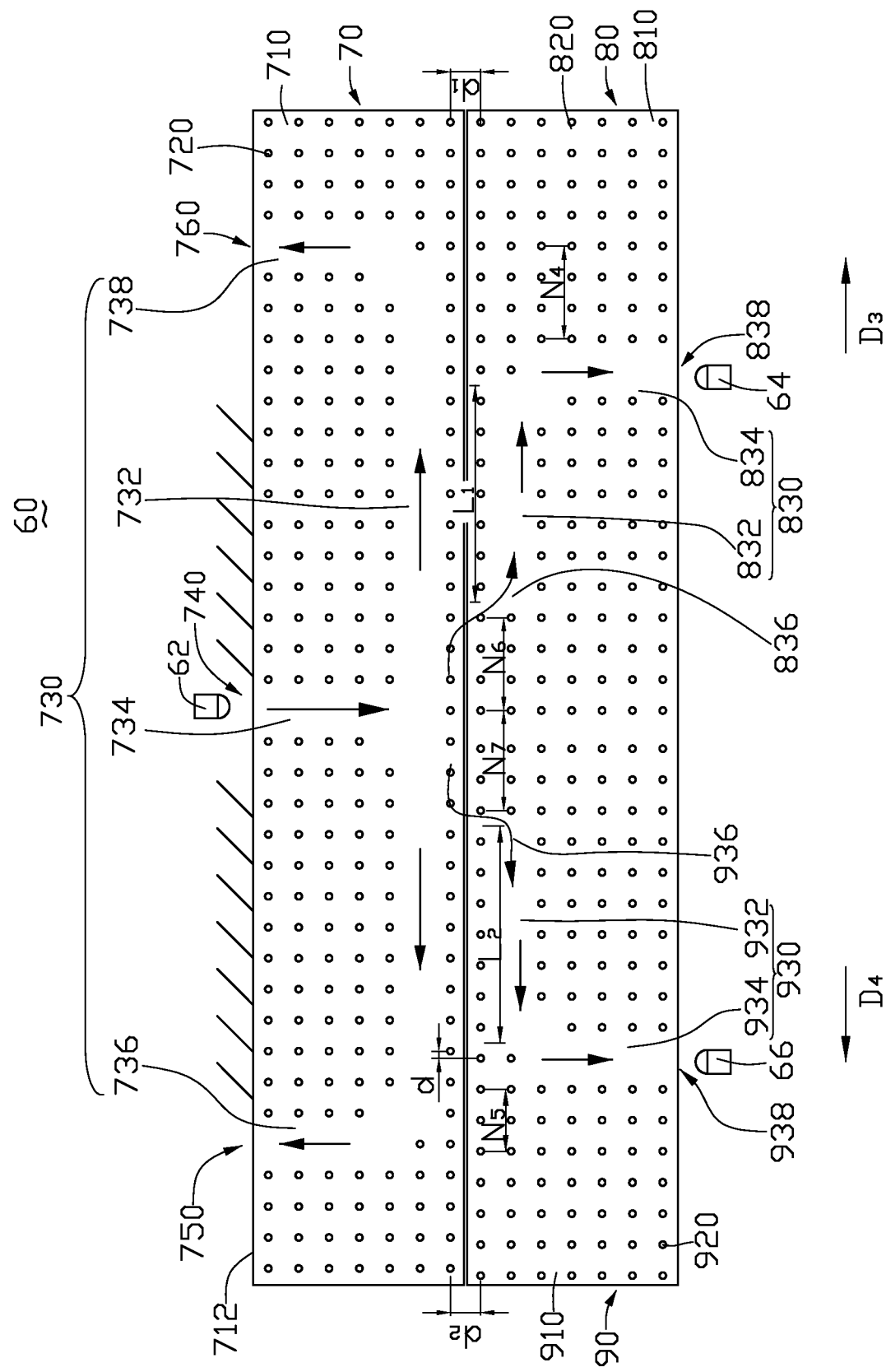
FIG. 3 is a schematic view of a micro displacement sensor, in accordance with a second embodiment.

Referring to FIG. 3, a micro displacement sensor 60, according to a second embodiment, is shown. The micro displacement sensor 60 includes a first photonic crystal module 70, a second photonic crystal module 80, a third photonic crystal module 90, a light source 62, a first detector 64 and a second detector 66.

In the present embodiment, because compositions, functions and characteristics of the first photonic crystal module 70, the second photonic crystal module 80, the light source 62 and detectors 64, 66 are similar to the same elements mentioned above, the detailed description is omitted for the sake of brevity.

In the present embodiment, the first photonic crystal module 70 includes a first substrate 710 and a plurality of first photonic crystals 720 disposed on the first substrate 710. The first photonic crystals 720 are arranged in a matrix and some of the first photonic crystals 720 are missing in order to form a first light-guide channel 730. The first light-guide channel 730 has a first part 732 and three second parts 734, 736, 738 disposed perpendicularly to and communicate with the first part 732, as shown in FIG. 3. Two of the second parts 736, 738 are disposed at two ends of the first part 732 and the other 734 is disposed between them so that the first light-guide channel 730 is in a "∃" shape. Each of the second parts 736, 738 at ends of the first part 732 has a light output end 750, 760 and the second part 734 disposed between them has a light input end 740 which the light source 62 is disposed adjacent to.

The second photonic crystal module 80 is parallel to and disposed to one side of the first photonic crystal module 70. The second photonic crystal module 80 includes a second substrate 810 and a plurality of second photonic crystals 820 disposed on the second substrate 810. The second substrate 810 and the first substrate 710 are coplanar. The second photonic crystals 820 are arranged in a matrix where an array of the second photonic crystals 820 is aligned with an array of the first photonic crystals 720. Some of the second photonic crystals 820 in the matrix are missing in order to form a second light-guide channel 830. In such case, the second light-guide channel 830 is in a "⊤" shape. The second light-guide channel 830 has a first light coupling end 836 and a first light detected end 838. The first detector 64 is disposed adjacent to the first light detected end 838.

The third photonic crystal module 90 interconnects with the first photonic crystal module 70 and the second photonic crystal module 80. That is, the third photonic crystal module 90 is parallel to and disposed to the side of the first photonic crystal module 70. In the present embodiment, the second photonic crystal module 80 and the third photonic crystal module 90 are integrated as a single module disposed opposite to the first photonic crystal module 70, as shown in FIG. 3. Alternatively, the second photonic crystal module 80 and the third photonic module 90 are as different elements disposed side by side (not shown in FIG.).

The third photonic crystal module 90 includes a third substrate 910 and a plurality of third photonic crystals 920. The first substrate 710, the second substrate 810 and third substrate 910 are disposed in the same plane (i.e. coplanar). The third photonic crystals 920 are disposed on the third substrate 910 and are arranged in a matrix. In addition, an array of third photonic crystals 920 in the matrix and an array of first photonic crystals 720 are disposed opposite and arranged staggered to each other. Particularly, the array of third photonic crystals 920 is arranged staggered to the array of first photonic crystals 720 by a distance d of about an odd numbered multiple of 0.25 a, where a is a lattice constant.

Some of the third photonic crystals 920 are missing. Defected photonic crystals are arranged in the matrix of the third photonic crystals 920 in order to form a third light-guide channel 930. The third light-guide channel 930 has a second light coupling end 936 and a second light detected end 938. The second detector 66 is disposed adjacent to the second light detected end 938. In the present embodiment, the third light-guide channel 930 is in a "⌐" shape, as shown in FIG. 3. In particular, the third light-guide channel 930 has a fifth part 932 and a sixth part 934 disposed perpendicularly to and communicates with the fifth part 932. The fifth part 932 spaces apart from and is parallel to the first part 732 of the first light-guide channel 730 by a row of the array of the first photonic crystals 720 and a row of the array of the third photonic crystals 920. In such case, the distance from the center of the last row of first photonic crystals 720, in the substrate 210, to the center of the first row of third photonic crystal 920, is $d_2$. The distance $d_2$ is in an approximately range from 0.7 a to 1.1 a. In the present embodiment, the distance $d_2$ and the distance $d_1$ from the center of the last row of first photonic crystal 720 to the center of the first row of the second photonic crystal 820 are the same. In addition, the fifth part 932 has a length in an approximately range from 10 a to 30 a, where a is a lattice constant.

Referring to FIG. 3, $N_4$ is referred to the distance from the column of photonic crystals that borders the right side of the fourth part 834 to the second part 738 having the light output end 760. $N_5$ is referred to the distance from the column of photonic crystals that borders the left side of the sixth part 934 to the second part 736 having the light output end 750. $N_6$ is referred to the distance from the first light coupling end 836 to the second part 734 having the light input end 740. $N_7$ is referred to the distance from the second light coupling end 936 to the second part 734 having the light input end 740. When the second photonic crystal module 80 and the third photonic crystal module 90 move relative to the first photonic crystal module 70 (e.g. move left or right relative to the first photonic crystal module 70), values of the $N_4$, $N_5$, $N_6$ and $N_7$ should always be positive in order to make sure that light traveling in the first part 732 of the first light-guide channel 730 will be coupled into the third part 832 of the second light-guide channel 830 and into the fifth part 932 of the third light-guide channel 930.

In particular, when the second photonic crystal module 80 and the third photonic crystal module 90 both move horizontally to the right, that is, in the direction of $D_3$, the fourth part 834 of the second light-guide channel 830 should not be to the right-side of the second part 738 having the light input end 760 and the second light coupling end 936 should not go beyond the second part 734 having the light input end 740. When the second photonic crystal module 80 and the third photonic crystal module 90 both move horizontally to the left, that is, in the direction of $D_4$, the sixth part 934 of the third light-guide channel 930 should not be the left side of the second part 736 having the light output end 750 and the first light coupling end 836 should not go beyond the second part 734 having the light input end 740.

In practice, the second photonic crystal module 80 and the third photonic crystal module 90 are both attached to a moving test object and the first photonic crystal module 70 is stationary. When the second photonic crystal module 80 and the third photonic crystal module 90 move with the moving test object and relative to the first photonic crystal module 70, light emitted from the light source 62 enters into the first light-guide channel 730 through the second part 734 having the light input end 740. Most of light from the light source 62 is guided in the first light-guide channel 730 and is split into two ways to be emitted from the light output ends 750, 760. Some of light, from the light source 62, is coupled into the second light-guide channel 830 through the first light-coupling end 836 based on a coupling effect. As a result, the portion of the light, coupled into the second light-guide channel 830, with be guided to and detected by the first detector 64. Some of light is coupled into the third light-guide channel 930 through the second light-coupling end 936. The portion of the light, coupled into the third light-guide channel 930, with be guided to and detected by the second detector 66.

Figure 4:
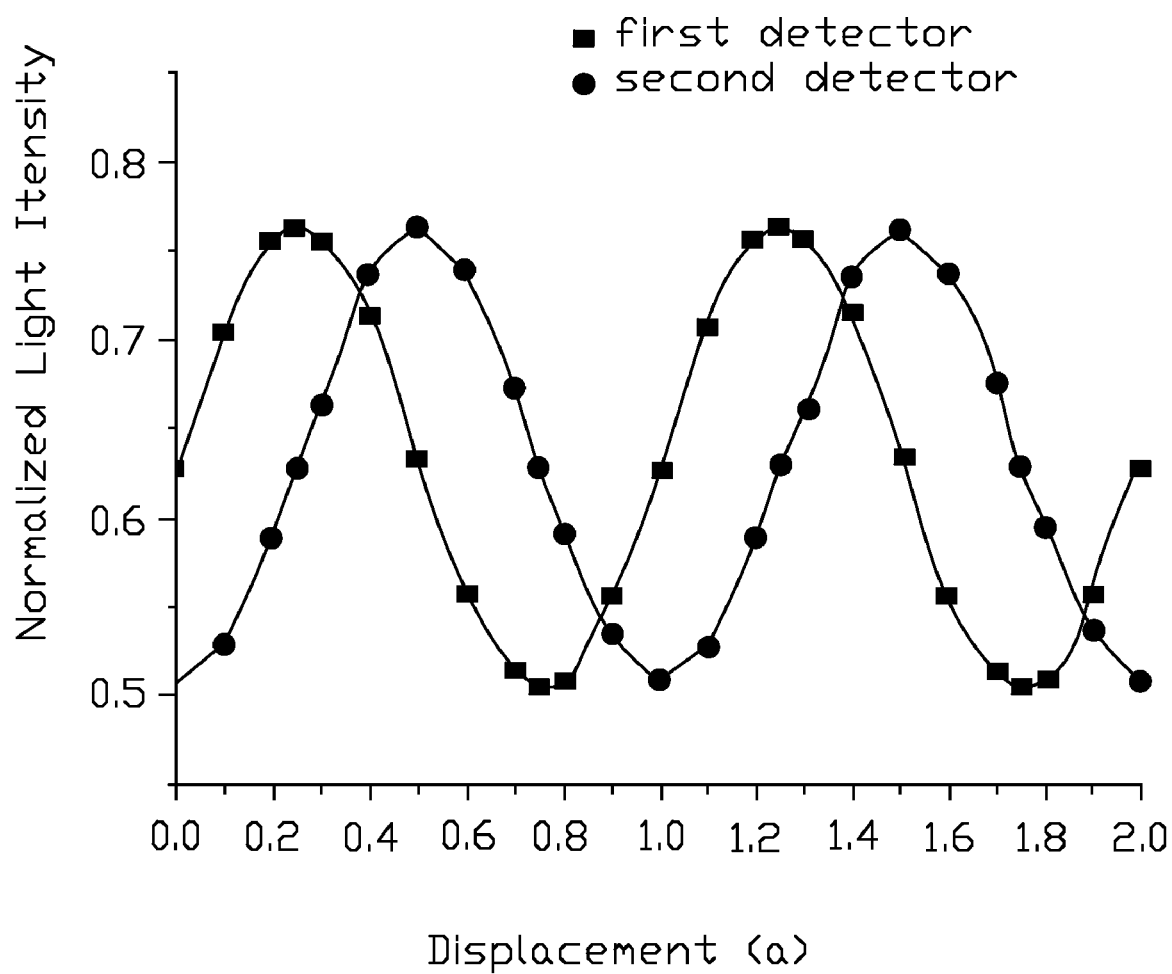
FIG. 4 is a graph of light intensity detected by the first detector and the second detector with respective to displacements measured by the micro displacement sensor of FIG. 3.

Referring to FIG. 4, a sinusoidal graph showing a correlation between the displacement of the moving test object and the light intensity detected by the first detector 64 and the second detector 66 is obtained. The displacements of the moving test object can be estimated according to such a sinusoidal graph. In addition, calculating the displacements with a subdivision method, the micro displacement sensor 60 in the present embodiment can have a resolution of less than 0.01 a, where a is a lattice constant. Moreover, values of the $N_4$, $N_5$, $N_6$ and $N_7$ can be changeable to widen a measurement range of the micro displacement sensor 60, e.g. over tenfold order of lattice constant.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A micro displacement sensor, comprising:
    a first photonic crystal module comprising a first substrate and a plurality of first photonic crystals, the first photonic crystals being disposed on the first substrate and being arranged in a matrix, the first photonic crystals defining a first light-guide channel having a light input end and a light output end, the first light-guide channel comprises a first part and at least two second parts;
    a second photonic crystal module comprising a second substrate, disposed parallel to the first substrate, and having a plurality of second photonic crystals, the second photonic crystals being disposed on the second substrate and being arranged in a matrix, the second photonic crystals defining a second light-guide channel having a third part, a fourth part and a light detected end,
    the first part of the first light-guide channel spacing apart from the third part of the second light-guide channel by a row of the array of the first photonic crystals and a row of the array of the second photonic crystals, the first part of the first light-guide channel and the third part of the second light-guide channel being parallel and juxtaposed with each other thereby achieving an optical coupling therebetween, such that some light in the first part of the first light-guide channel can be coupled into the second light-guide channel via the third part;
    the second photonic crystal module configured for being caused to move relative to the first photonic crystal module thereby yielding a change in optical coupling efficiency of the optical coupling;
    a light source disposed adjacent to the light input end of the first photonic crystal module; and
    a detector disposed adjacent to the light detected end of the second photonic crystal module, the detector configure for detecting chances in light intensity of the counted light emitting from the light detected end due to the change in the coupling efficiency.

2. The micro displacement sensor as claimed in claim 1, wherein a lattice constant of the first photonic crystal is about equal to that of the second photonic crystal.

3. The micro displacement sensor as claimed in claim 2, wherein the lattice constant is in an approximately range from 100 nm to 100 μm.

4. The micro displacement sensor as claimed in claim 1, wherein the first photonic crystal or the second photonic crystal bas a crystallite diameter in an approximately range from 0.3 a to 0.7 a, where a is a lattice constant.

5. The micro displacement sensor as claimed in claim 1, wherein the second parts are disposed perpendicularly to and communicate with the first part.

6. The micro displacement sensor as claimed in claim 1, wherein the fourth part is disposed perpendicularly to and communicates with the third part.

7. The micro displacement sensor as claimed in claim 1, wherein a distance from the center of the row of the first photonic crystal to the center of the row of the second photonic crystal is in an approximately range from 0.7 a to 1.1 a, where a is a lattice constant.

8. The micro displacement sensor as claimed in claim 1, wherein the third part has a length in an approximately range from 10 a to 30 a, where a is a lattice constant.

9. The micro displacement sensor as claimed in claim 1, wherein the detector is an optical fiber detector.

10. The micro displacement sensor as claimed in claim 1, wherein the first substrate or the second substrate is made of an insulating material or a semi-conduction material.

11. A micro displacement sensor, comprising:
    a first photonie crystal module comprising a first substrate and a plurality of first photonic crystals, the first photonic crystals being disposed on the first substrate and being arranged in a matrix, the first photonic crystals defining a first light-guide channel having a light input end and two light output ends, the first light channel comprises a first part and three second part;
    a second photonic crystal module comprising a second substrate, disposed parallel to the first substrate, and a plurality of second photonic crystals, the second photonic crystals being disposed on the second substrate and being arranged in a matrix, the second photonic crystals defining a second light-guide channel having a third part, a fourth part and a first light detected end;
    a third photonic crystal module interconnected with the first photonic crystal module and the second photonic crystal module, the third photonic crystal module comprising a third substrate and a plurality of third photonic crystals, the third photonic crystals are disposed on the third substrate and arranged in a matrix, and the third photonic crystals defining a third light-guide channel having a fifth part, a sixth part and a second light detected end;
    the first part of the first light-guide channel spacing apart from the third part of the second light-guide channel and the fifth part of the third light-guide channel by a row of the array of the first photonic crystals and a row of the array of the second photonic crystals, both of the third part of the second light-guide channel and the fifth part of the third light-guide channel being parallel and juxtaposed with the first part of the first light-guide channel thereby achieving an optical coupling into the therebetween such that some light in the first part of the first light-guide channel can be coupled into the second light-guide channel and the third light-guide channel via the third part and the fifth part respectively;
    the second and third photonic crystal modules configured for being caused to to move relative to the first photonic crystal module thereby yielding changes in optical coupling efficiency of the optical coupling;
    a light source disposed adjacent to the light input end of the first photonic crystal module;
    a first detector disposed adjacent to the first light detected end of the second photonic crystal module; and
    a second detector disposed adjacent to the second light detected end of the third phototropic crystal module,
    the first and second detectors configured for detecting changes in the light intensity of the coupled light emitting from the light detected ends due to the changes in the coupling efficiency.

12. The micro displacement sensor as claimed in claim 11, wherein the lattice constant of the first photonic crystal, the second photonic crystal or the third photonic crystal is in an approximately range from 100 nm to 100 μm.

13. The micro displacement sensor as claimed in claim 11, wherein an array of first photonic crystals and an array of third photonic crystals are disposed opposite and arranged staggered to each other.

14. The micro displacement sensor as claimed in claim 13, wherein the array of first photonic crystals is arranged staggered to the array of third photonic crystals by a distance of about an odd numbered multiple of 0.25 a, where a is a lattice constant.

15. The micro displacement sensor as claimed in claim 11, wherein the second parts are disposed perpendicularly to and communicate with the first part.

16. The micro displacement sensor as claimed in claim 11, wherein the sixth part is disposed perpendicularly to and communicates with the fifth part.

17. The micro displacement sensor as claimed in claim 11, wherein a distance from the center of the row of the first photonic crystal to the center of die row of the third photonic crystal is in an approximately range from 0.7 a to 1.1 a, where a is a lattice constant.

18. The micro displacement sensor as claimed in claim 16, wherein the fifth part has a length in an approximately range from 10 a to 30 a, where a is a lattice constant.

* * * * *